UNITED STATES PATENT OFFICE.

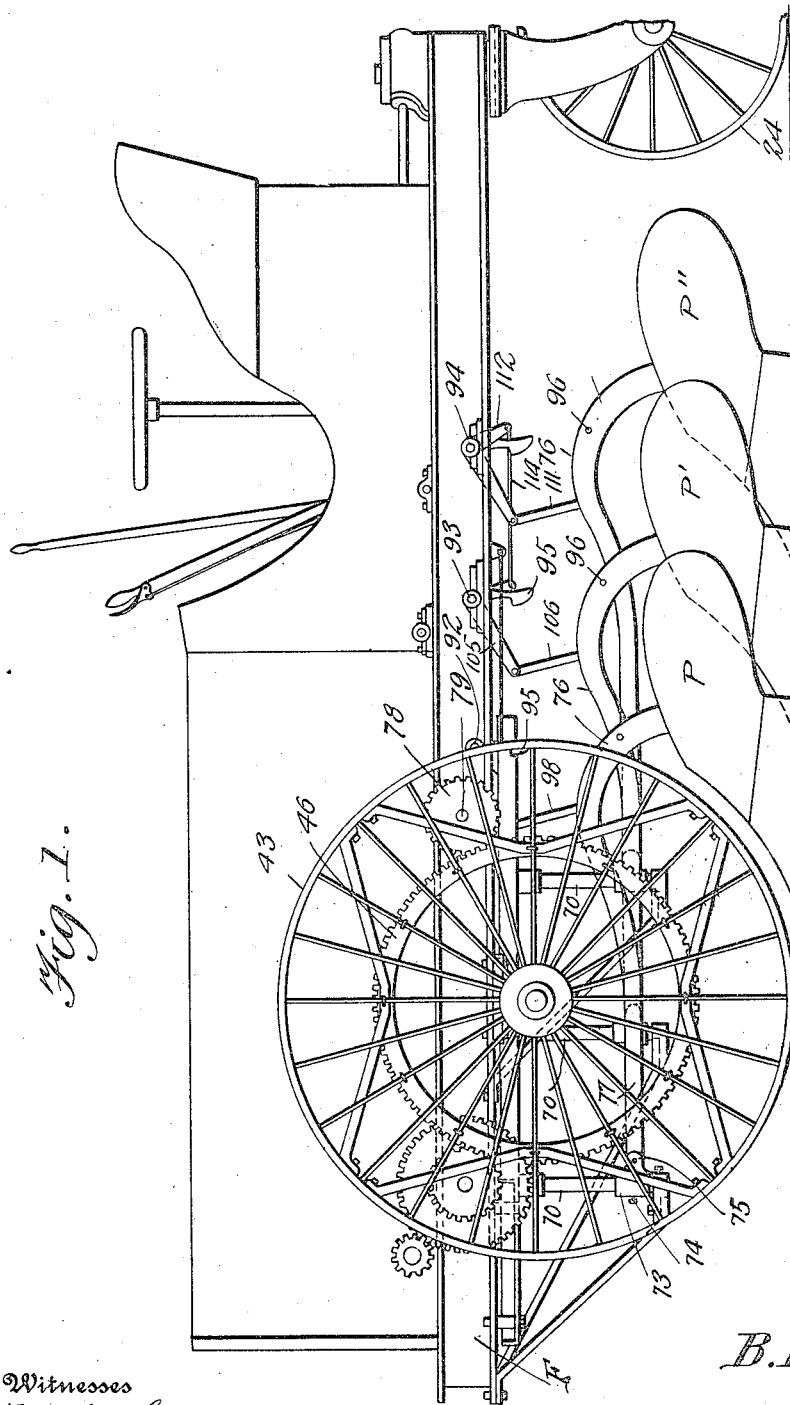

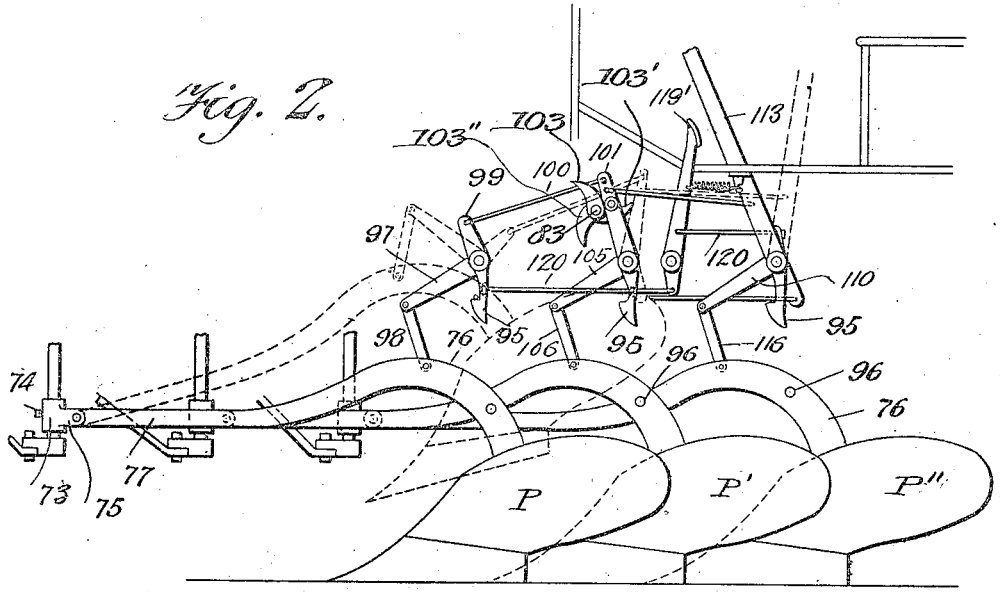
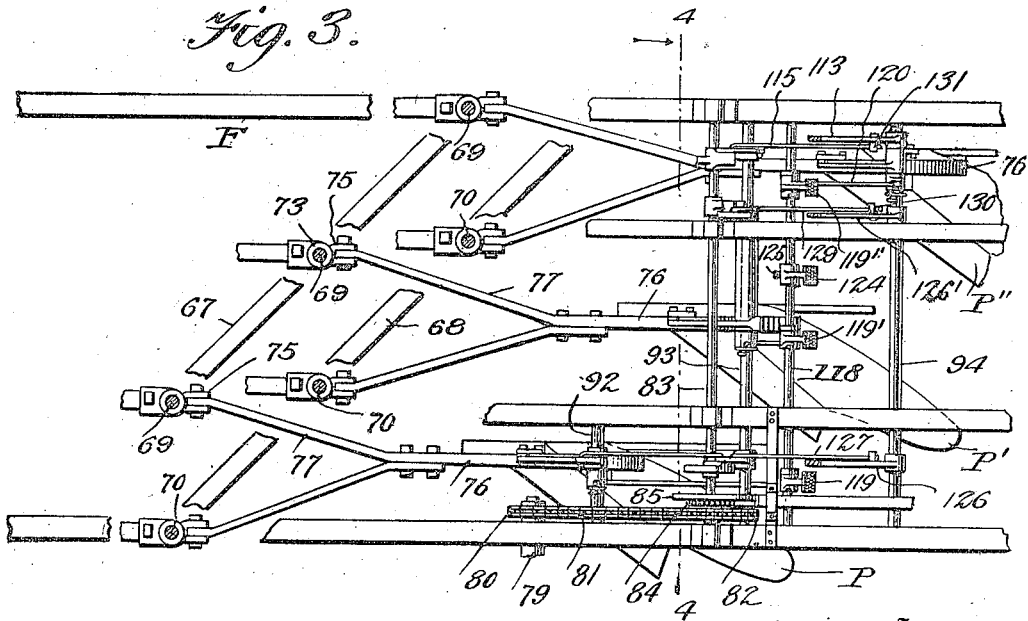

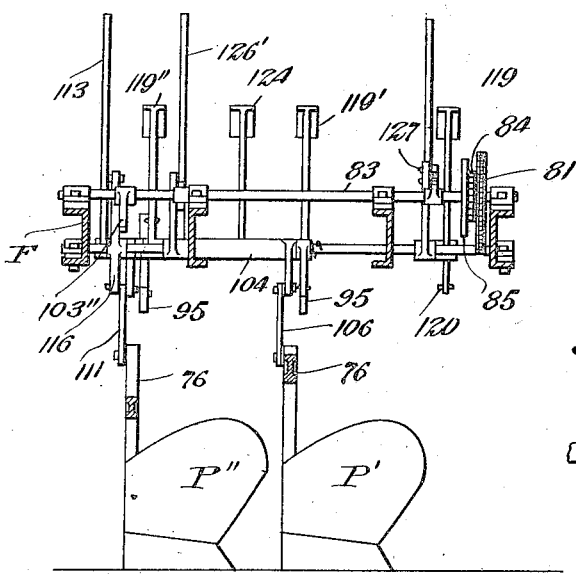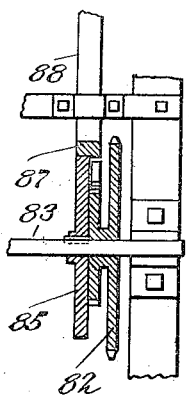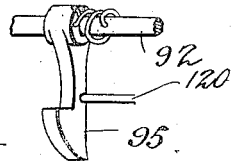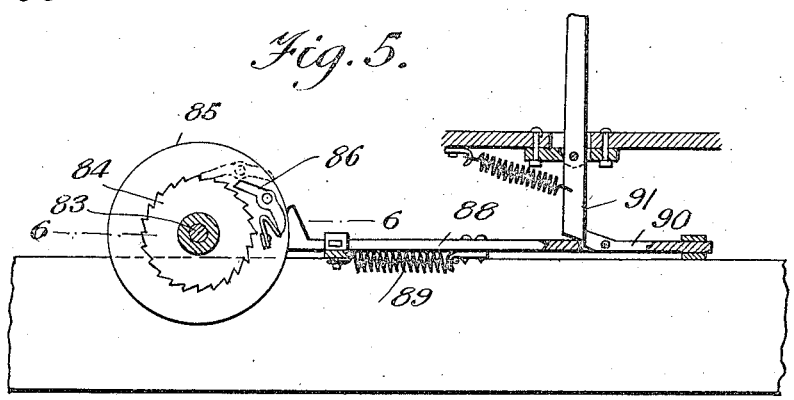

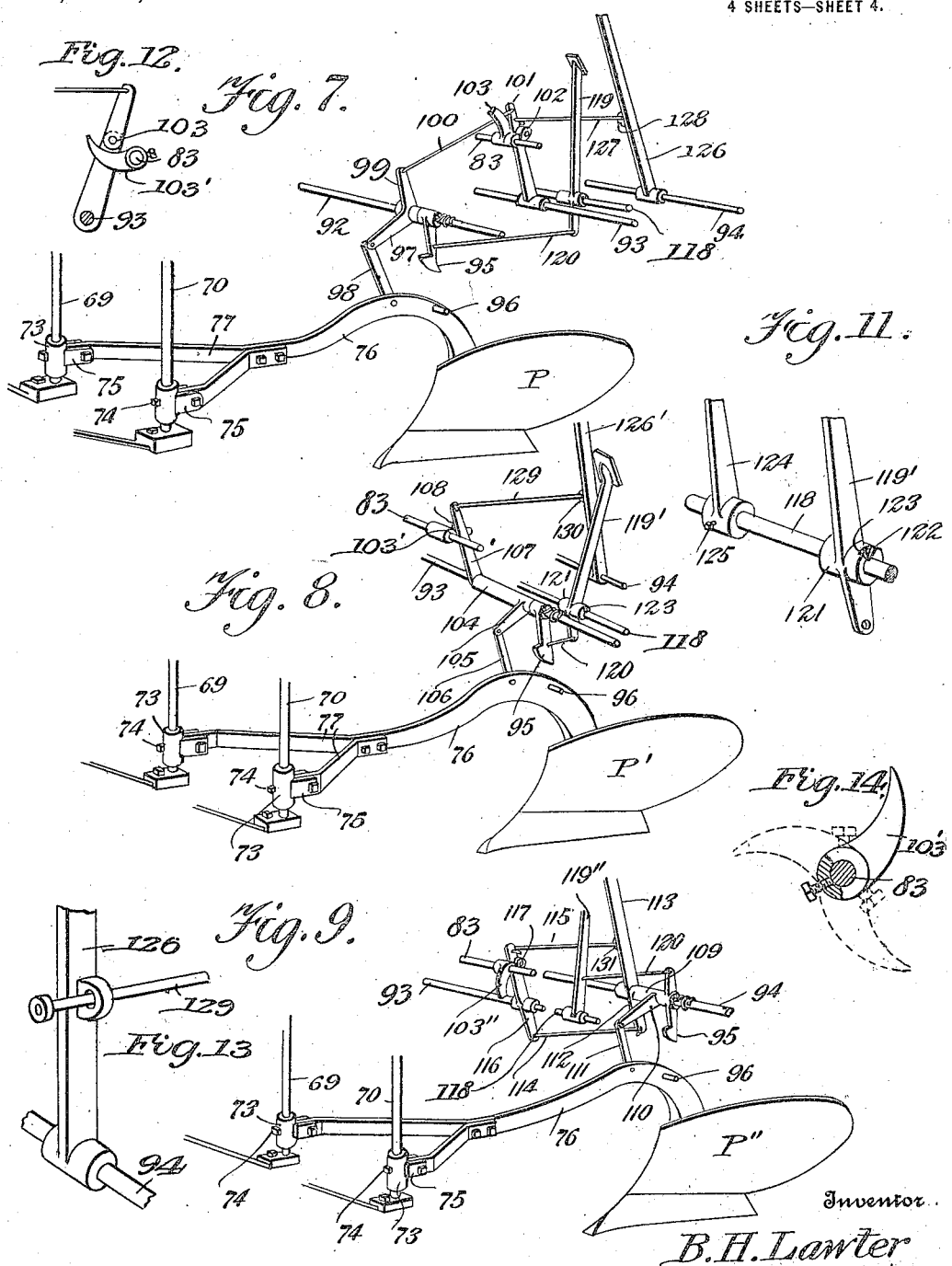

BENJAMIN H. LAWTER, OF NEWCASTLE, INDIANA, ASSIGNOR TO THE LAWTER TRACTOR CO., OF ST. MARYS, OHIO, A CORPORATION OF OHIO.

MOTOR-PROPELLED AGRICULTURAL MACHINERY.

1,159,965.   Specification of Letters Patent.   Patented Nov. 9, 1915.

Original application filed January 31, 1913, Serial No. 745,427. Divided and this application filed March 31, 1914. Serial No. 873,539.

*To all whom it may concern:*

Be it known that I, BENJAMIN H. LAWTER, a citizen of the United States, residing at Newcastle, in the county of Henry and State of Indiana, have invented new and useful Improvements in Motor-Propelled Agricultural Machinery, of which the following is a specification.

This invention relates to motor propelled agricultural machinery, and it has particular reference to a gang plow that is driven by a tractor of simple and improved construction.

The present application is a division of application, Serial No. 745,427, filed by me on January 31, 1913.

The prime object of the present invention is to provide simple and improved means whereby the plows may be raised from the ground by power supplied by the motor and whereby the plows of the gang may be raised from the ground individually or collectively as may be desired.

Further objects of the invention will hereinafter appear.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a side elevation of a machine constructed in accordance with the invention. Fig. 2 is a diagrammatic view in side elevation of the plows constituting the gang and the levers whereby the plows are manipulated and adjusted. Fig. 3 is a diagrammatic plan view of the parts shown in Fig. 2. Fig. 4 is a transverse sectional view taken on the line 4—4 in Fig. 3. Fig. 5 is a detail view partly in side elevation and partly in section illustrating a portion of the actuating means for the plow lifting device. Fig. 6 is a sectional detail view taken substantially on the line 6—6 in Fig. 5. Figs. 7, 8 and 9 are perspective detail views illustrating the adjusting means for the individual plows of a three-plow gang as used in connection with the invention. Fig. 10 is a perspective detail view of one of the plow supporting latch members and related parts. Fig. 11 is a perspective detail view of some of the lifting levers. Figs. 12, 13 and 14 are detailed views of features of the invention.

Corresponding parts in the several figures are denoted by like characters of reference.

The frame of the improved machine which is generally designated by the letter F may be of any convenient construction, said frame being supported on ground wheels 24 and 43, the construction and arrangement being substantially as set forth in my co-pending application, Serial No. 745,427, previously referred to. The frame is provided with diagonally disposed cross bars 67, 68 having downwardly extending vertically disposed shafts 69, 70 arranged in transversely alined pairs and with which the beams 76 of the plows are connected for vertical adjustment, said beams being provided with forwardly divergent arms 77 which are pivotally connected with lugs 75 of sleeves 73 associated with the shafts 69, 70 and capable of being mounted in adjusted position by set screws 74 or other convenient means.

For the purpose of raising or lifting the plows from the ground by power derived from the motor, means are provided including a pinion 78 meshing with the annular gear 46 on the furrow traction wheel 43, said pinion being mounted on a shaft 79 carrying a sprocket wheel 80 which is connected by a chain 81 with a sprocket wheel 82 on a shaft 83 that extends transversely across the frame of the machine. Associated with the sprocket wheel 82 for rotation therewith is a ratchet wheel 84, said sprocket and ratchet being loose on the shaft 83 as will be best seen by reference to Fig. 3. Fixedly supported on the shaft 83 adjacent to the ratchet wheel 84 is a disk 85 carrying a spring actuated dog or pawl 86 which is capable of engaging the ratchet wheel 83. The heel of the dog 86, when the nose of said dog is in engagement with the ratchet wheel is adapted to project beyond the perimeter of the latter so as to be engaged by a shoe 87 carried by a slide 88 which by an actuating spring 89 is normally forced in the direction of the disk 85. It will be readily understood that when the machine is in operation, motion is transmitted to the ratchet wheel 84 as long as the furrow traction wheel is in motion. The normal position of the parts is indicated in Figs. 5 and 6, by reference to which it will be seen that the shoe 87 of the slide 88 abuts on the periphery of the disk 85 where it engages the heel of the spring actuated dog 86, thereby keeping said dog out of engagement with the ratchet wheel, the disk 85 being thus maintained stationary. When the slide is retracted, the spring actuated dog will engage the ratchet wheel, and the disk 85 will be caused to rotate together with the shaft 83 on which it is mounted. The release of the spring actuated slide 88 will cause the shoe 87 to be placed in the path of the dog 86 in such a fashion that when the heel of the dog engages the shoe the dog will be thrown out of engagement with the ratchet wheel, thereby stopping the rotation of the disk 85 and the shaft 83. Thus, by momentarily retracting the slide 88 and again releasing it the shaft 83 will be caused to make a single rotation at the end of which it will stop.

The slide 88 has been shown as being equipped with a trigger 90 located in the path of a spring actuated lever 91, one end of which extends within convenient reach of the operator. By throwing the lever against the tension of its actuating spring, said lever will engage the trigger 90 to retract the slide 88. When the lever 91 describes an arc sufficient to carry it out of engagement with the trigger, the slide is automatically restored to its initial position by the spring 89; when the lever is released its actuating spring will restore it to its initial position, the pivotally supported trigger being momentarily depressed by engagement with the lever, after which said trigger member is restored by gravity to its initial position.

Transverse supporting shafts 92, 93 and 94 are provided, one for each of the plows, of which three have been shown, the forward left-hand plow being designated by P, the middle plow by P', and the right-hand rear plow by P". Each of the shafts 92, 93 and 94 carries a spring actuated hook or latch member 95, said latch members being adapted to engage pins or studs 96 on the beams of the respective plows for the purpose of supporting said plows above the ground, out of position for operation. The shaft 92 carries a bell crank having arms, one of which, 97, is connected by a link 98 with the beam of the plow P, the other arm 99 of said bell crank being connected by a link 100 with an arm 101 that extends radially from the shaft 93 on which it is pivotally mounted. The arm 101 carries an anti-friction element such as roller 102 which is located in the path of a cam 103 mounted on the shaft 83 in such fashion that the cam 103 wiping the roller 102 will thereby cause the arm 101 to actuate the bell crank on the shaft 92 to elevate the plow P until the pin 92 engages the latch member 95 thereby supporting said plow in a raised position as indicated by dotted lines in Fig. 2.

The shaft 93 carries a pivoted sleeve 104 having radial arms constituting a bell crank, one of said arms 105 being connected by a link 106 with the beam 76 of the plow P'; the other arm 107 is provided with an anti-friction element such as a roller 108 which is located in the path of a cam 103' mounted on the shaft 83 in such fashion that the cam 103' wiping the roller 108 will thereby actuate the bell crank formed by the arms 107, 105 to elevate the plow P' until the pin 96 associated with the beam thereof engages the latch member 95 which is supported on the shaft 93 in a position to coöperate therewith.

The shaft 94 carries a pivoted sleeve 109 which is provided with radial arms that combine to form a bell crank, one of said arms 110 being connected by a link 111 with the beam 76 of the plow P", the other arm 112 of the bell crank being extended downwardly from the sleeve. An additional arm or lever 113 extending radially from the shaft 94 adjacent and fixed to the sleeve 109 constitutes a hand lever which is extended within convenient reach of the operator. The crank arm 112 and the lever 113 are connected by links 114, 115 with the arms of a lever 116 fulcrumed on the shaft 93; one arm of said lever having an anti-friction element, such as a roller 117 which is disposed in the path of a cam 103" mounted on the shaft 83 in such fashion that the cam 103" wiping the roller 117 will thereby cause the lever 116 to actuate the bell crank comprising the arms 112, 110 extending from the sleeve 109 on the shaft 94 to elevate the plow P" until the pin 96 extending from the beam 76 of said plow engages the latch member 95 mounted on the shaft 94 in alinement therewith, thereby supporting said plow in a raised position.

A shaft 118 which is supported in parallel relation to the shafts 92, 93 and 94 carries a series of foot levers, three of which are designated by the numerals 119, 119', 119", each of said foot levers being connected by a link 120 with one of the latch members 95 for the purpose of actuating such latch member to release the plow supported thereby and permitting such plow to drop by gravity to a ground engaging position. It has already been stated that each of the latch members 95 is spring actuated to maintain it in an engaging position with respect to the pin 96 of one of the plow beams. It will be further noted that each of the latch member actuating levers has a collar 121, see Fig. 11, provided with a notch 122 which receives a pin or stud 123 extending from the shaft 118 on which the levers are mounted, thereby limiting the movement of the latch members without interfering with their operation. An additional foot lever 124 is secured on the shaft 118 by means, such as a set screw indicated in Fig. 3 at 125; by means of said foot lever 124 the shaft 118 may be rocked for the purpose of simultaneously actuating the three latch members through the medium of the pins 123 engaging the notches 122, thereby permitting the three plows to be simultaneously released and restored from an elevated to a ground engaging position.

For the purpose of raising or lifting the plows manually, as will sometimes be necessary when the machine is in motion, hand levers 126, 126' are provided, said hand levers serving to elevate the plows P and P'; the plow P'' being lifted by means of the hand lever 113 previously mentioned. The levers 126, 126' are fulcrumed on the shaft 94 which also carries the hand lever 113, and said hand levers are extended within convenient reach of the operator. The lever 126 is connected by a link 127, which slidably engages a lug 128 extending from said lever, see Fig. 7, with the lever 101 which rocks on the shaft 93 and which, as previously described, is connected by the link 100 with the arm 99 of the bell crank controlling the plow P. It will be seen that by manipulating the lever 126, the bell crank may be rocked so as to lift the plow P. A link 129 which slidably engages a lug 130 projecting from the lever 126' connects said lever with the arm 107 of the bell crank controlling the plow P' so that the latter may be lifted by manipulating the lever 126'. The link 115 which connects the hand lever 113 with the lever 116 slidably engages a lug 131 projecting from said hand lever 113, by manipulating which latter the lever 116 may be rocked to actuate the bell crank comprising the arms 112, 110 and which controls the plow P'', for the purpose of lifting the latter. By reason of the links 127, 129 and 115 being slidably connected with the hand levers 126, 126' and 113, it is obvious that when the power means are employed for the purpose of lifting the plows, the position of the hand levers controlling said plows remains unchanged, and the hand lifting means may thus be employed independently of one another without conflict.

With respect to the power lifting means, it will be readily understood that the position of the cams 103, 103' and 103'' on the shaft 83 will determine whether the plows are to be lifted simultantously or one by one. It is evident that the lifting of the several plows will be accomplished by a single rotation of the shaft 83 carrying the cams, means having been provided whereby the movement of the shaft will be stopped when one rotation has been completed. If the cams be disposed on said shaft in alinement with each other, or in such position with respect to the anti-friction elements engaged thereby that the members carrying said anti-friction elements be simultaneously actuated by the cams, it is evident that the three plows will be simultaneously lifted from the ground. On the other hand, by placing said cams at an angle with respect to each other, the lifting of the plows may be effected gradually, and by placing the cam at an angle of approximately 120 degrees to one another, it will be found that the lifting of one plow may be almost or quite completed before the lifting of the next one begins. By properly arranging and proportioning the parts, it follows that the lifting of the plows may be accomplished *ad seriatim* in such a manner that straining of the mechanism will be avoided; and by raising the front plow first and the following ones in proper succession, the furrows made by the plows may be made to terminate in a line with each other, if so desired.

From the foregoing description taken in connection with the drawings hereto annexed, the operation and advantages of this invention will be readily understood. The tractor, while particularly adapted for operating a gang plow, may obviously be utilized for other purposes. The gang plow structure herein described as associated with and operated by the tractor is simple, convenient and easily adjusted and operated.

Having thus described the invention, what is claimed as new, is:—

1. In a machine of the class described, a tractor frame, a plow including a beam, means associated with the tractor frame with which the plow beam is pivotally connected, a shaft supported on the tractor frame, in superposed relation to the plow, a bell crank on the shaft, a link connecting an arm of the bell crank with plow beam, a power driven rotary element, a shaft intermittently driven by said rotary element, means for interrupting the rotation of the shaft at the completion of one revolution, and actuating means for the plow lifting bell crank on the shaft including a cam adjustably mounted on the intermittently rotatable shaft to actuate the bell crank.

2. In a machine of the class described, the combination with a tractor frame of a plow including a beam, means associated with the tractor frame with which the plow beam is pivotally connected, an intermittently rotatable power driven shaft which is normally stationary, means for interrupting the rotation of said shaft at the completion of one revolution, plow lifting means including a bell crank, and a cam, the latter being adjustable mounted on the intermittently rotatable shaft, latch means for supporting the plow in raised position, means for operating the supporting latch to release the plow, and a hand lever whereby the plow may be independently elevated irrespective of the power lifting means.

In testimony whereof I affix my signature in presence of two witnesses.

BENJAMIN H. LAWTER.

Witnesses:
A. J. INDERRIEDEN,
H. E. JENNINGS.

Copies of this patent may be obtained for five cents each, by addressing the "Commissioner of Patents, Washington, D. C."